US011939556B2

(12) United States Patent
Sutton, Jr. et al.

(10) Patent No.: US 11,939,556 B2
(45) Date of Patent: Mar. 26, 2024

(54) CLEANING COMPOSITION COMPRISING AN ALKYLAMIDOALKYL ALKYLDIMONIUM ALKYLSULFATE AS AN IONIC LIQUID

(71) Applicant: S.C. Johnson & Son, Inc., Racine, WI (US)

(72) Inventors: Art Daniels Sutton, Jr., Mount Pleasant, WI (US); Lisa Flugge-Berendes, Kenosha, WI (US); Michael S. Haas, Franklin, WI (US)

(73) Assignee: S. C. Johnson & Son, Inc., Racine, WI (US)

(*) Notice: Subject to any disclaimer, the term of this patent is extended or adjusted under 35 U.S.C. 154(b) by 366 days.

(21) Appl. No.: 17/216,104

(22) Filed: Mar. 29, 2021

(65) Prior Publication Data

US 2021/0214653 A1 Jul. 15, 2021

Related U.S. Application Data

(60) Division of application No. 16/204,808, filed on Nov. 29, 2018, now Pat. No. 10,988,711, which is a continuation of application No. 15/849,953, filed on Dec. 21, 2017, now Pat. No. 10,179,890, which is a division of application No. 15/095,907, filed on Apr. 11, 2016, now Pat. No. 9,920,284.

(60) Provisional application No. 62/151,047, filed on Apr. 22, 2015.

(51) Int. Cl.

| | |
|---|---|
| ***C11D 1/645*** | (2006.01) |
| ***C11D 1/62*** | (2006.01) |
| ***C11D 3/30*** | (2006.01) |
| ***C11D 3/33*** | (2006.01) |
| ***C11D 3/48*** | (2006.01) |

(52) U.S. Cl.

CPC .................. *C11D 3/30* (2013.01); *C11D 1/62* (2013.01); *C11D 3/33* (2013.01); *C11D 3/48* (2013.01)

(58) Field of Classification Search

CPC .. C11D 1/62; C11D 1/645; C11D 1/72; C11D 3/33; C11D 7/3218; C11D 1/835; C11D 7/5013

See application file for complete search history.

(56) References Cited

U.S. PATENT DOCUMENTS

| | | | |
|---|---|---|---|
| 4,240,921 A | 12/1980 | Kaniecki | |
| 4,284,435 A | 8/1981 | Fox | |
| 4,551,506 A | 11/1985 | Gosselink | |
| 4,556,504 A | 12/1985 | Rek | |
| 5,414,124 A | 5/1995 | Smith et al. | |
| 5,441,541 A | 8/1995 | Mehreteab et al. | |
| 5,472,455 A | 12/1995 | Mehreteab et al. | |
| 5,552,089 A | 9/1996 | Misselyn et al. | |
| 5,554,320 A | 9/1996 | Yianakopoulos | |
| 5,559,091 A | 9/1996 | Geboes et al. | |
| 5,679,629 A | 10/1997 | Kubota et al. | |
| 5,767,056 A | 6/1998 | Lenoir | |
| 5,798,329 A | 8/1998 | Taylor et al. | |
| 5,827,451 A | 10/1998 | Cummings et al. | |
| 5,939,059 A | 8/1999 | Franklin et al. | |
| 5,962,388 A | 10/1999 | Sherry et al. | |
| 5,994,602 A | 11/1999 | Abdul-Sada et al. | |
| 6,100,227 A | 8/2000 | Burlew | |
| 6,149,898 A * | 11/2000 | Peffly | A61K 8/068 424/78.02 |
| 6,462,014 B1 | 10/2002 | Johnson et al. | |
| 6,465,403 B1 | 10/2002 | Skee | |
| 6,482,793 B1 | 11/2002 | Gordon et al. | |
| 6,509,012 B1 | 1/2003 | Hossel et al. | |
| 6,544,350 B2 | 4/2003 | Muller et al. | |
| 6,573,405 B1 | 6/2003 | Abbott et al. | |
| 6,605,584 B2 | 8/2003 | Fong et al. | |
| 6,693,070 B1 | 2/2004 | Cheung et al. | |
| 6,878,681 B1 | 4/2005 | Gohl et al. | |
| 6,903,149 B2 | 6/2005 | Yasuda et al. | |
| 6,953,773 B2 | 10/2005 | Pereira et al. | |
| 7,179,453 B1 * | 2/2007 | Montgomery | A61K 8/34 424/73 |
| 7,183,433 B2 | 2/2007 | Abbott et al. | |
| 7,186,675 B2 | 3/2007 | Meine et al. | |
| 7,189,685 B2 | 3/2007 | Hubig et al. | |
| 7,196,221 B2 | 3/2007 | Abbott et al. | |
| 7,235,494 B2 | 6/2007 | Andreas | |
| 7,348,303 B2 | 3/2008 | Gallotti et al. | |
| 7,544,807 B2 | 6/2009 | Wasserscheid et al. | |
| 7,588,645 B2 | 9/2009 | Griese et al. | |
| 7,737,106 B2 | 6/2010 | Kenneally et al. | |
| 7,776,810 B2 | 8/2010 | Jordan, IV et al. | |
| 7,786,064 B1 | 8/2010 | Hecht et al. | |
| 7,786,065 B2 | 8/2010 | Hecht et al. | |
| 7,863,458 B2 | 1/2011 | Wasserscheid et al. | |
| 7,880,024 B2 | 2/2011 | Lim et al. | |
| 7,928,053 B2 | 4/2011 | Hecht et al. | |
| 8,110,537 B2 | 2/2012 | Gohl et al. | |
| 8,308,824 B2 | 11/2012 | Wood et al. | |
| 8,481,474 B1 | 7/2013 | Blattner et al. | |
| 8,518,298 B2 | 8/2013 | Abbott | |

(Continued)

FOREIGN PATENT DOCUMENTS

| | | |
|---|---|---|
| CN | 101629382 A | 1/2010 |
| CN | 103849490 | 6/2014 |

(Continued)

OTHER PUBLICATIONS

Abstract of DE 1924332, 1 page.

(Continued)

*Primary Examiner* — Charles I Boyer

(57) ABSTRACT

An aqueous cleaning composition, which may be suitable for use in cleaning hard surfaces, is described. The aqueous cleaning composition includes an ionic liquid solvent, an amino alcohol, and a substantial amount of water. The cleaning compositions may also include a disinfecting quaternary surfactant, a nonionic surfactant, such as an ethoxylated alcohol and/or alkyl polyglycoside, and/or a chelating agent, such as an aminopolycarboxylate chelating agent.

17 Claims, 1 Drawing Sheet

(56) References Cited

U.S. PATENT DOCUMENTS

| | | | | |
|---|---|---|---|---|
| 8,709,169 | B2 | 4/2014 | Company et al. | |
| 8,716,207 | B2 | 5/2014 | Blattner et al. | |
| 8,901,061 | B2 | 12/2014 | D'Ambrogio et al. | |
| 9,090,855 | B2 | 7/2015 | Polzin et al. | |
| 9,157,051 | B2 | 10/2015 | D'Ambrogio et al. | |
| 9,359,499 | B2 | 6/2016 | Cernohous | |
| 9,719,057 | B2 | 8/2017 | Nielsen et al. | |
| 9,920,284 | B2 | 3/2018 | Sutton et al. | |
| 10,179,890 | B2 | 1/2019 | Sutton et al. | |
| 2003/0064910 | A1 | 4/2003 | Fong et al. | |
| 2003/0228991 | A1 | 12/2003 | Johnson et al. | |
| 2004/0077519 | A1 | 4/2004 | Price et al. | |
| 2004/0138084 | A1 | 7/2004 | Gohl et al. | |
| 2004/0266658 | A1 | 12/2004 | Lenhart | |
| 2005/0164903 | A1 | 7/2005 | Ko et al. | |
| 2005/0283925 | A1* | 12/2005 | Glenn | A61Q 5/10 8/405 |
| 2006/0019863 | A1 | 1/2006 | Hubig et al. | |
| 2006/0084729 | A1 | 4/2006 | Clarke | |
| 2006/0157089 | A1 | 7/2006 | Taylor et al. | |
| 2006/0234889 | A1 | 10/2006 | Griese et al. | |
| 2006/0234890 | A1 | 10/2006 | Griese et al. | |
| 2007/0010607 | A1 | 1/2007 | Smith et al. | |
| 2008/0139443 | A1 | 6/2008 | Buzinski et al. | |
| 2008/0299062 | A1* | 12/2008 | Kripp | A61K 8/365 424/65 |
| 2010/0016205 | A1 | 1/2010 | Schwab | |
| 2010/0099314 | A1 | 4/2010 | Hecht et al. | |
| 2012/0114584 | A1* | 5/2012 | Woghiren | A61K 8/43 424/70.2 |
| 2012/0258067 | A1 | 10/2012 | Yang et al. | |
| 2013/0247308 | A1 | 9/2013 | Duerrschmidt et al. | |
| 2014/0065088 | A1 | 3/2014 | Frantz et al. | |
| 2014/0083465 | A1 | 3/2014 | D'Ambrogio et al. | |
| 2014/0090671 | A1 | 4/2014 | D'Ambrogio et al. | |
| 2014/0121291 | A1 | 5/2014 | Cernohous | |
| 2016/0017262 | A1 | 1/2016 | Monster et al. | |
| 2016/0151527 | A1 | 6/2016 | Holland et al. | |
| 2017/0073615 | A1 | 3/2017 | Company et al. | |

FOREIGN PATENT DOCUMENTS

| | | | |
|---|---|---|---|
| CN | 104293489 | | 1/2015 |
| EP | 0 111 965 | | 7/1989 |
| GB | 1 531 751 | A | 11/1978 |
| GB | 2 067 196 | | 7/1981 |
| GB | 2 204 321 | A | 11/1988 |
| WO | WO-2004/003120 | A2 | 1/2004 |
| WO | WO-2006/088737 | | 8/2006 |
| WO | WO-2012/177276 | | 12/2012 |
| WO | WO-2012/177277 | A1 | 12/2012 |
| WO | WO-2014/058402 | A2 | 4/2014 |
| WO | WO-2016/049391 | | 3/2016 |

OTHER PUBLICATIONS

CN103849490A, Abstract, Jun. 11, 2014, 1 page.
CN104293489A, Abstract, Jan. 21, 2015, 1 page.
International Search Report and Written Opinion for PCT Application No. PCT/2016/028051, dated Aug. 3, 2016, 12 pages.

* cited by examiner

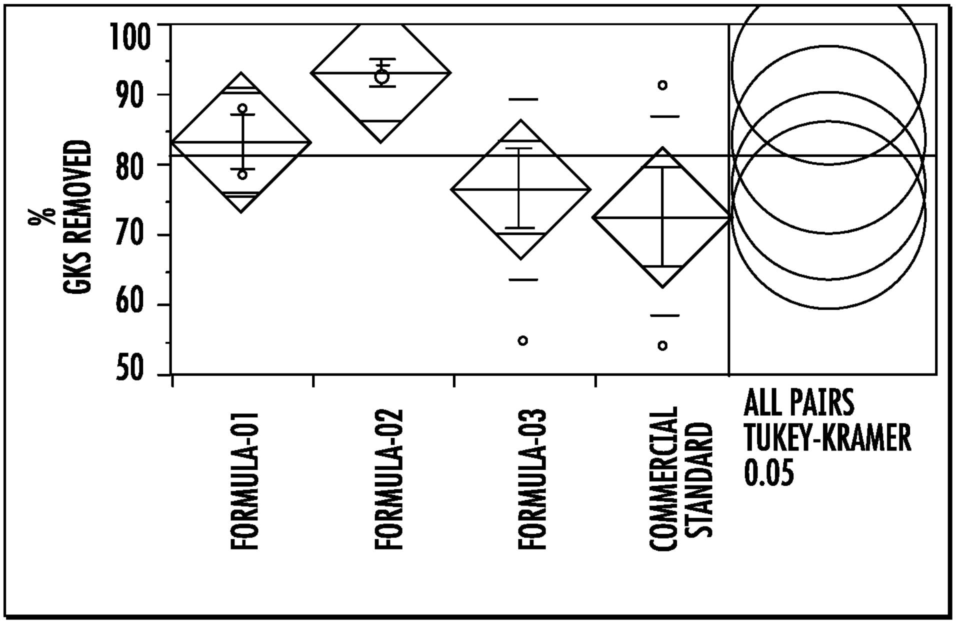
100
90
80
70
60
50
%
GKS REMOVED
FORMULA-01
FORMULA-02
FORMULA-03
COMMERCIAL
STANDARD
ALL PAIRS
TUKEY-KRAMER
0.05

CLEANING COMPOSITION COMPRISING AN ALKYLAMIDOALKYL ALKYLDIMONIUM ALKYLSULFATE AS AN IONIC LIQUID

CROSS-REFERENCE TO RELATED APPLICATIONS

This patent application is a divisional of U.S. application Ser. No. 16/204,808, filed on Nov. 29, 2018, which is a continuation of U.S. application Ser. No. 15/849,953, filed on Dec. 21, 2017, which is a divisional of U.S. application Ser. No. 15/095,907, filed on Apr. 11, 2016, which claims the benefit of U.S. Provisional Application Ser. No. 62/151,047, filed on Apr. 22, 2015, the entire contents of which are hereby incorporated by reference, for any and all purposes.

BACKGROUND

Most current cleaning products, which are effective for grease removal, include using a "smelly" cleaner and compensate for the unpleasant odor by running a fan, opening a window, or leaving the room; using a bad smelling cleaner but then following up with an air freshener or other solution; or using a cleaner that is not as effective and put more effort into cleaning the mess. Current commercial cleaning products that perform well on the removal of greasy soil often have an unpleasant odor. For instance, some cleaners are quite unpleasant to use and others may have a bleach odor, which many consumers find objectionable.

SUMMARY

The present application relates generally to the field of cleaning compositions and, in particular, aqueous cleaning compositions which may be especially useful for cleaning hard surfaces. The present cleaning compositions include an ionic liquid and an amino alcohol. In ready to use form, the present cleaning compositions are typically aqueous compositions which include a substantial amount of water, e.g., at least about 85 wt. % and often at least about 90 wt. % or even 95 wt. % or higher. The ionic liquid may suitably include one or more of choline alkylsulfate; polyalkoxylated alkylammonium quaternary salt; N,N,N-trimethyl-alkyl ammonium fatty alkanoate ("alkyl trimonium fatty alkanoate"); fatty alkylamidoalkyl alkyldimonium alkyl sulfate; 1,3-dihydrocarbyl substituted imidazolium salt; and di(fatty acyloxyalkyl)-hydroxyalkyl alkylammonium quaternary salt. For example, the ionic liquid may include polyalkoxy quaternary ammonium salt and/or 1,3-dialkyl substituted imidazolium salt. The cleaning compositions may also include a disinfecting quaternary surfactant, such as a quaternary benzyl ammonium surfactant, and/or nonionic surfactant, such as ethoxylated alcohol. Optionally, the cleaning compositions may also include one or more adjuvants, such as a fragrance, a complexing agent, and/or a bleaching agent. The composition commonly includes about 0.05-3 wt. % of the ionic liquid, about 0.05-5 wt. % of the amino alcohol; and at least about 90 wt. % water. Examples of suitable amino alcohols include diisopropanolamine, isopropanolamine, triethanolamine, diethanolamine and/or monoethanolamine.

Some embodiments provide an aqueous cleaning concentrate, which may include (a) about 3-15 wt. % ionic liquid; (b) about 3-15 wt. % amino alcohol; and (c) at least about 50 wt. % water. The ionic liquid typically includes choline alkylsulfate; polyalkoxylated alkylammonium quaternary salt; alkyl trimonium fatty alkanoate; fatty alkylamidoalkyl alkyldimonium alkylsulfate; 1,3-dihydrocarbyl substituted imidazolium salt; and/or di(fatty acyloxyalkyl)hydroxyalkyl alkylammonium quaternary salt. The cleaning concentrate may also include about 3-15 wt. % quaternary benzyl ammonium surfactant; and/or about 3-15 wt. % nonionic surfactant. In some aspects, the cleaning concentrate may also include an aminopolycarboxylate chelating agent, such as an iminodisuccinate salt, e.g., an alkali metal iminodisuccinate salt such as $Na_4$ iminodisuccinate. The cleaning composition are typically diluted with water before use to provide compositions of the type described herein as a "ready-to-use" aqueous cleaning composition.

In one embodiment, the cleaning composition comprises an ionic liquid, which includes a polypropoxy quaternary ammonium salt. Such a cleaning composition may be an aqueous composition, which includes the ionic liquid together with an amino alcohol, such as diisopropanolamine and/or monoethanolamine, optionally, disinfecting quaternary surfactant, optionally, nonionic surfactant, and a substantial percentage of water, e.g., at least about 90 wt. %.

In some embodiments, the cleaning composition consists essentially of: (a) a polypropoxy quaternary ammonium halide ionic liquid; (b) amino alcohol, such as diisopropanolamine, isopropanolamine, triethanolamine, diethanolamine and/or monoethanolamine; (c) quaternary benzyl ammonium surfactant; (d) nonionic surfactant; (e) optionally, one or more adjuvants, such as a fragrance and/or bleaching agent, and (f) a balance of water.

In one embodiment, the cleaning composition includes about 0.1-0.5 wt. % a polypropoxylated 2-(diethylmethylammonio)ethanol salt having about 5 to 15 propoxy units; about 1-4 wt. % diisopropanolamine and/or monoethanolamine; about 0.05-0.5 wt. % of an N-alkyl-N,N-dimethyl (optionally substituted)benzyl ammonium salt; about 0.05-0.5 wt. % of a polyethylene glycol ether of a $C_{8-12}$-Guerbet alcohol having about 5 to 15 ethoxy units and/or an ethoxylated $C_{10-15}$ linear alkyl alcohol having about 5 to 15 ethoxy units; and at least about 95 wt. % water.

In another embodiment, the cleaning composition includes an ionic liquid, which includes a 1,3-dihydrocarbyl substituted imidazolium salt. Such a cleaning composition may be an aqueous composition, which includes the ionic liquid together with an amino alcohol, such as diisopropanolamine and/or monoethanolamine, optionally, disinfecting quaternary surfactant, optionally, nonionic surfactant; and a substantial percentage of water, e.g., at least about 90 wt. %. In some embodiments, the 1,3-dihydrocarbyl substituted imidazolium salt may include a 1,3-dialkyl substituted imidazolium alkyl sulfate. In some embodiments, the ionic liquid includes 1-methyl-3-butylimidazolium octyl sulfate; the amino alcohol includes diisopropanolamine, isopropanolamine, triethanolamine, diethanolamine and/or monoethanolamine; the disinfecting quaternary surfactant includes quaternary benzyl ammonium surfactant; and the nonionic surfactant includes ethoxylated alcohol. The nonionic surfactant may include a polyethylene glycol ether of a $C_{8-12}$-Guerbet alcohol. In some embodiments, the nonionic surfactant may include a polyethylene glycol ether of a $C_{10}$-Guerbet alcohol. In other embodiments, the nonionic surfactant may include an ethoxylated $C_{10-15}$-fatty alcohol.

In some embodiments, the cleaning composition consists essentially of: (a) a 1,3-dialkyl substituted imidazolium salt ionic liquid; (b) amino alcohol, such as diisopropanolamine, isopropanolamine, triethanolamine, diethanolamine and/or monoethanolamine; (c) quaternary benzyl ammonium surfactant; (d) nonionic surfactant; (e) optionally, one or more adjuvants, such as a fragrance and/or bleaching agent, and (f) a balance of water.

In general, ionic liquids refer to a class of materials including molten salts which remain liquid at temperatures of 100° C. or below. The ionic liquids are described as having a discernible melting point (based on DSC analysis) and are "flowable" at temperatures of about 100° C. or below. Ionic liquids have very low vapor pressure and generate virtually no hazardous vapors. As a result of the charged species comprising the ionic fluids, they can provide a highly polar medium. Ionic liquids are generally appreciated to be environmental-friendly or "green" alternatives to conventional organic solvents.

The present cleaning compositions are commonly environmentally friendly due to being based on a low volatile organic content (VOC) formulation. Even though having significantly lower amounts of solvents as compared to conventional hard surface cleaning compositions, no loss of performance as to cleaning is present (rather improved cleaning is typically obtained). As referred to herein, a low VOC is considered to be no more than about 4 wt. %, commonly no more than about 3 wt. %, desirably no more than about less than or equal to 2 wt. %. In some embodiments, other than the amino alcohol component, the composition is substantially free (<0.1 wt. %) of volatile organic compounds.

BRIEF DESCRIPTION OF THE DRAWINGS

FIG. 1 is a graph illustrating the effectiveness in the removal of greasy kitchen soil of the exemplary formulations of the present cleaning compositions described in Example 1 ("Formula-01"—Formula-1A; "Formula-02"—Formula-1B; "Formula-03"—Formula-1C).

DETAILED DESCRIPTION

The present cleaning compositions can exhibit excellent performance against grease removal. Generally the inclusion of solvents in commercial cleaning products is needed in order to achieve acceptable levels of grease removal. The present ionic liquid based cleaning formulas are very effective against grease removal even when containing extremely low levels of solvent and/or may not contain any solvent/VOC other than the amino alcohol component. An added benefit of reducing or eliminating solvent is the ability to comply with VOC regulation in the US, while still providing a formula highly effective on grease removal.

In one aspect, the aqueous cleaning composition may include an ionic liquid, an amino alcohol, and water. In some embodiments, the ionic liquid includes one or more of the following ionic liquids:

a) polyalkoxy quaternary ammonium salt;
b) 1,3-dihydrocarbyl substituted imidazolium salt;
c) N-alkyl-N,N-dipolyethoxyethyl-N-fatty alkylammonium alkyl sulfate;
d) alkylamidopropyl alkyldimonium alkyl sulfate;
e) N,N,N-trimethyl-alkyl ammonium fatty alkanoate ("alkyl trimonium fatty alkanoate");
f) choline ($C_{6-10}$)-alkyl sulfate; and
g) a quaternary ammonium salt prepared by reacting fatty acid (e.g., $C_{16-18}$ fatty acid) with N-alkyl-N,N,N',N'-tetrakis(2-hydroxypropyl)-ethylene-diamine alkyl sulfate or tris-(hydroxyethyl)-alkyl ammonium alkyl sulfate.

In another aspect, the aqueous cleaning composition may include (a) an ionic liquid, which comprises polypropoxy quaternary ammonium chloride and/or 1,3-dialkyl substituted imidazolium alkyl sulfate; (b) an amino alcohol; (c) optionally, a disinfecting quaternary surfactant; (d) optionally, a nonionic surfactant; and (e) water. In some embodiments, other than the amino alcohol, the composition is substantially free (<0.1 wt. %) of volatile organic compounds. In some embodiments, the composition may have a volatile organic content (VOC) of no more than about 4 wt. %. Preferably, the composition has a VOC of no more than <2 wt. %. The composition may include about 0.05-3 wt. % of the ionic liquid; about 0.05-5 wt. % of the amino alcohol; and at least about 90 wt. % water. In some instances, the cleaning compositions may also include one or more adjuvants, such as a fragrance, a complexing agent, and/or a bleaching agent.

In some embodiments, the aqueous cleaning composition may consist essentially of: (a) a polypropoxy quaternary ammonium halide ionic liquid; (b) amino alcohol selected from diisopropanolamine, isopropanolamine, triethanolamine, diethanolamine and/or monoethanolamine; (c) optionally, quaternary benzyl ammonium surfactant; (d) optionally, nonionic surfactant; and (e) optionally, chelating agent; and (f) water.

In another embodiment, the ionic liquid may include a polypropoxylated 2-(diethylmethylammonio)ethanol salt; the amino alcohol may include diisopropanolamine and/or monoethanolamine; the disinfecting quaternary surfactant may include N—$C_{10-18}$-alkyl-N,N-dimethyl benzyl ammonium halide and/or N—$C_{10-18}$-alkyl-N,N-dimethyl ethylbenzyl ammonium halide; and the nonionic surfactant may include an ethoxylated alcohol. The ionic liquid may include a polypropoxylated 2-(diethylmethylammonio)ethanol chloride salt; the amino alcohol may include diisopropanolamine and/or monoethanolamine; the disinfecting quaternary surfactant may include N-n-$C_{12-14}$-alkyl-N,N-dimethyl benzyl ammonium chloride and/or N-n-$C_{12-14}$-alkyl-N,N-dimethyl ethylbenzyl ammonium chloride; and the nonionic surfactant may include a polyethylene glycol ether of a $C_{8-12}$-Guerbet alcohol. The ionic liquid may include a polypropoxylated 2-(diethylmethylammonio)ethanol chloride salt; the amino alcohol may include diisopropanolamine and/or monoethanolamine; the disinfecting quaternary surfactant may include N-n-$C_{12-14}$-alkyl-N,N-dimethyl benzyl ammonium chloride and/or N-n-$C_{12-14}$-alkyl-N,N-dimethyl ethylbenzyl ammonium chloride; and the nonionic surfactant may include a polyethylene glycol ether of a $C_{10}$-Guerbet alcohol. In some embodiments, the ionic liquid is a polypropoxylated 2-(diethylmethylammonio)ethanol chloride salt; the amino alcohol is diisopropanolamine and/or monoethanolamine; the disinfecting quaternary surfactant is N-n-$C_{12-14}$-alkyl-N,N-dimethyl benzyl ammonium chloride and/or N-n-$C_{12-14}$-alkyl-N,N-dimethyl ethylbenzyl ammonium chloride; and the nonionic surfactant is a polyethylene glycol ether of a $C_{10}$-Guerbet alcohol. In some embodiments, the polypropoxy quaternary ammonium chloride may include about 5 to 30 propoxy groups. In another embodiment, the polypropoxy quaternary ammonium chloride may include about 5 to 15 propoxy groups. The polypropoxy quaternary ammonium chloride may include polypropoxylated 2-(diethylmethylammonio)ethanol halide.

In some embodiments, the aqueous cleaning composition may include (a) about 0.05-3 wt. %, preferably about 0.1-2 wt. %, or more preferably 0.1-1 wt. % of the ionic liquid; (b) about 0.5-5 wt. % of the amino alcohol; (c) 0 to about 1 wt. % of the disinfecting quaternary surfactant; (d) 0 to about 5 wt. % of the nonionic surfactant; and (e) at least about 90 wt. % water. The composition may include (a) about 0.05-3 wt. % polypropoxy quaternary ammonium chloride ionic liquid; (b) about 1-4 wt. % diisopropanolamine and/or monoethanolamine; (c) about 0.05-0.5 wt. % of the disinfecting quaternary surfactant; and (d) about 0.05-3 wt. % of the nonionic surfactant, which comprises ethoxylated alcohol. The composition may also further include fragrance.

In one aspect, the aqueous cleaning composition may consist essentially of (a) about 0.05-3 (preferably 0.1-1 wt. %) polypropoxy quaternary ammonium halide ionic liquid; (b) about 0.1-5 (preferably 0.5-4) wt. % amino alcohol; (c) about 0.05-1 wt. % disinfecting quaternary surfactant; (d) 0 to about 2 wt. % nonionic surfactant; (e) 0 to about 2 wt. % of one or more adjuvants; and (f) a balance water. The polypropoxy quaternary ammonium halide ionic liquid may include a polypropoxylated 2-(diethylmethylammonio)ethanol chloride; the amino alcohol may include diisopropanolamine and/or monoethanolamine; the disinfecting quaternary surfactant may include quaternary benzyl ammonium surfactant; and the nonionic surfactant may include ethoxylated alcohol. In some embodiments, the one or more adjuvants may include fragrance. In some embodiments, the aqueous cleaning composition may consist essentially of: (a) 0.05-1 wt. % polypropoxylated 2-(diethylmethylammonio)ethanol chloride; (b) about 1-4 wt. % diisopropanolamine and/or monoethanolamine; (c) about 0.1-0.3 wt. % N-n-$C_{12-14}$-alkyl-N,N-dimethyl benzyl ammonium chloride and/or N-n-$C_{12-14}$-alkyl-N,N-dimethyl ethylbenzyl ammonium chloride; (d) about 0.1-0.5 (preferably about 0.1-0.3) wt. % polyethylene glycol ether of a $C_{8-12}$-Guerbet alcohol; (e) 0 to about 2 wt. % of one or more adjuvants; and (f) a balance water.

In another aspect, the aqueous cleaning composition may include (a) an ionic liquid, which comprises 1,3-dialkyl substituted imidazolium alkyl sulfate; (b) an amino alcohol; (c) optionally, a disinfecting quaternary surfactant; (d) optionally, a nonionic surfactant; and (e) water. In some embodiments, the 1,3-dihydrocarbyl substituted imidazolium salt may be a 1,3-dialkyl substituted imidazolium alkyl sulfate salt. In another embodiment, the 1,3-dihydrocarbyl substituted imidazolium salt may be a 1-$C_{1-3}$-alkyl-3-n-$C_{2-8}$-alkyl substituted imidazolium $C_{6-12}$-alkyl sulfate salt, e.g., a 1-methyl-3-n-$C_{3-6}$-alkyl substituted imidazolium $C_{6-10}$-alkyl sulfate salt and/or a 1-ethyl-3-n-$C_{3-6}$-alkyl substituted imidazolium $C_{6-10}$-alkyl sulfate salt. In some embodiments, the composition may include about 0.05-3 wt. % of the ionic liquid; about 0.05-5 wt. % of amino alcohol; and at least about 90 wt. % water. The composition may include (a) about 0.1-1 wt. % of the ionic liquid; (b) about 1-4 wt. % of the amino alcohol; (c) about 0.1-0.5 wt. % of the disinfecting quaternary surfactant; (d) about 0.5-3 wt. % of the nonionic surfactant; (e) about 0-2 wt. % of one or more adjuvants; and (f) a balance water. In some embodiments, the disinfecting quaternary surfactant may include a quaternary benzyl ammonium surfactant. The quaternary benzyl ammonium surfactant may include an N-alkyl-N,N-dimethyl (opt. substituted)benzyl ammonium salt. In some embodiments, the disinfecting quaternary surfactant may include N—$C_{10-18}$-alkyl-N,N-dimethyl benzyl ammonium halide and/or N—$C_{10-18}$-alkyl-N,N-dimethyl ethylbenzyl ammonium halide. In another embodiment, the disinfecting quaternary surfactant may include N-n-$C_{12-14}$-alkyl-N,N-dimethyl benzyl ammonium chloride and/or N-n-$C_{12-14}$-alkyl-N,N-dimethyl ethylbenzyl ammonium chloride.

In some embodiments, the nonionic surfactant includes alkoxylated alcohol, alkylpolygycoside, alkyl amine oxide, and/or polyethoxylated fatty ester.

The nonionic surfactant may be an alkoxylated alcohol, such as an ethoxylated ($C_{10}$-$C_{15}$) linear or branched aliphatic alcohol. The ethoxylated alcohol may have an average of about 5-15, typically 6-12 ethylene oxide groups. Nonlimiting examples include ethoxylated long chain $C_{10}$-Guerbet alcohols, such as those produced by BASF and sold under the trade names LUTENSOL® XL100, LUTENSOL® XL80, LUTENSOL® XL70, LUTENSOL® XL60 and LUTENSOL® XP80 and. Particularly suitable nonionic surfactants include ethoxylated $C_{10}$-Guerbet alcohols having an HLB of from about 10 to about 15, commonly from about 12 to about 15. Examples include LUTENSOL XL80—an ethoxylated $C_{10}$-Guerbet alcohol with an average of 8 ethylene oxide (EO) groups, LUTENSOL® XL100—an ethoxylated $C_{10}$-Guerbet alcohol with an average of 10 EO groups, and an ethoxylated $C_{10}$-Guerbet alcohol having an HLB of about 13, such as the surfactant produced by BASF Corp. and sold under the trade name LUTENSOL® XL70.

Other examples of suitable nonionic surfactants include ethoxylated linear alcohols, such as ethoxylated linear alcohols having a $C_{10}$-$C_{15}$ n-alkyl group. Nonlimiting examples include LUTENSOL® TDA 10 (produced by BASF)—an ethoxylated tridecyl alcohol having an average of 10 EO groups, Genapol® LA 070S—an ethoxylated lauryl alcohol having an average of 7 EO groups, Tomadol® 91-6—a $C_9$-$C_{11}$ ethoxylated alcohol having an average of 6 EO groups, and LUTENSOL® AO-8—a synthetic $C_{13}$-$C_{15}$ ethoxylated oxo alcohol having an average of 8 EO groups.

Additional nonionic surfactants which may be present can be selected to enhance detergency and/or stability of the composition. For example, detergency can be enhanced by the inclusion of about 1 to about 3 wt. % of a nonionic surfactant such as an alkyl polyglycoside, e.g. Glucopon® 425N. Other detergency providing nonionic surfactants conventionally known are also suitable for inclusion within an amount as defined above. Nonionic surfactants includable to enhance stability of composition components, such as fragrance(s) if present, are secondary ethoxylated alcohols, such as $C_{11}$-$C_{15}$ secondary ethoxylated alcohols. Secondary ethoxylated alcohols suitable for use are sold under the tradename TERGITOL® by Dow Chemical. For example TERGITOL® 15-S, more particularly TERGITOL® 15-S-12 is a $C_{11}$-$C_{15}$ secondary ethoxylate alcohol having an average of about 12 ethylene oxide groups.

Other exemplary useful nonionic surfactants include a variety of known nonionic surfactant compounds. Practically any hydrophobic compound having a carboxy, hydroxy, amido, or amino group with a free hydrogen attached to the nitrogen can be condensed with ethylene oxide or with the polyhydration product thereof, polyethylene glycol, to form a nonionic surfactant compound with varying degrees of water soluble—depending on the relative length of the hydrophobic and hydrophilic polyethylenoxy elements. Exemplary nonionic compounds include the polyoxyethylene ethers of alkyl aromatic hydroxy compounds, e.g., alkylated polyoxyethylene phenols, polyoxyethylene ethers of long chain aliphatic alcohols (also referred to herein as "ethoxylated alcohols"), the polyoxyethylene ethers of hydrophobic propylene oxide polymers, and the higher alkyl amine oxides.

Further nonionic surfactants which may be optionally present in the aqueous cleaning compositions are alkyl polyglycosides. Suitable alkyl polyglycosides include known nonionic surfactants which are alkaline and electrolyte stable. Alkyl mono and polyglycosides are generally prepared by reacting a monosaccharide, or a compound hydrolyzable to a monosaccharide with an alcohol such as a fatty alcohol in an acid medium. The fatty alcohol may have from about 8 to 30 and typically 8 to 18 carbon atoms. Examples of such alkylglycosides include, APG 325 CS GLYCOSIDE which is reported to be a 50% $C_9$-$C_{11}$ alkyl polyglycoside (commercially available from Henkel Corp, Ambler Pa.) and GLUCOPON® 625 CS which is reported to be a 50% $C_{10}$-$C_{16}$ alkyl polyglycoside.

Alkylpolyglycosides suitable for use in the present compositions may have the formula:

$$RO—(R'O)_x—Z_n$$

where R is a monovalent alkyl radical containing 8 to 20 carbon atoms (the alkyl group may be straight or branched, saturated or unsaturated), R' is a divalent alkyl radical containing 2 to 4 carbon atoms, preferably ethylene or propylene, x is a number having an average value of 0 to about 12, Z is a reducing saccharide moiety containing 5 or 6 carbon atoms, such as a glucose, galactose, glucosyl, or galactosyl residue, and n is a number having an average value of about 1 to 10. Some exemplary alkyl polyglycosides are sold under the name GLUCOPON® (where Z is a glucose moiety and x=0).

A further class of exemplary useful nonionic surfactants include nonionic surfactant compounds which are based on a polymeric alkylene oxide block copolymer. Polymeric alkylene oxide block copolymers include nonionic surfactants in which the major portion of the molecule is made up of block polymeric $C_2$-$C_4$ alkylene oxides. Such nonionic surfactants, while preferably built up from an alkylene oxide chain starting group, can have as a starting nucleus almost any active hydrogen containing group including, without limitation, amides, phenols, thiols, and secondary alcohols. One suitable class of such nonionic surfactants containing the characteristic alkylene oxide blocks are those which may be generally represented by formula (A):

$$HO\text{-}(EO)x(PO)y(EO)z\text{-}H \qquad (A)$$

where EO represents ethylene oxide, PO represents propylene oxide, y equals at least 15, and (EO)x+z equals 20 to 50% of the total weight of said compounds. Often the total molecular weight of the alkylene oxide block copolymer is in the range of about 2000 to 15,000. Examples of further useful nonionic surfactant compounds which include as a major portion of the molecule a block polymeric alkylene oxide are those materials presently commercially available under the tradename "Pluronic®", and in particular the Pluronic® L series, Pluronic® P series, as well as in the Pluronic® R series, each of which are generally described to be block copolymers of propylene oxide and ethylene oxide, and are presently commercially available from BASF AG (Ludwigshafen, Germany) and/or from BASF Corp. (Mt. Olive Township, N.J.).

Additional suitable nonionic surfactants include linear alkyl amine oxides. Typical linear alkyl amine oxides include water-soluble amine oxides of the formula $R^1$—N($R^2$)($R^3$)O where $R^1$ is typically a $C_8$-$C_{18}$ alkyl moiety and the $R^2$ and $R^3$ moieties are typically selected from the group consisting of hydrogen, $C_1$-$C_3$ alkyl groups and $C_1$-$C_3$ hydroxyalkyl groups. Quite often, $R^1$ is a $C_8$-$C_{18}$ n-alkyl and $R^2$ and $R^3$ are methyl, ethyl, propyl, isopropyl, 2-hydroxethyl, 2-hydroxypropyl and/or 3-hydroxypropyl. The linear amine oxide surfactants in particular may include linear $C_{10}$-$C_{18}$ alkyl dimethyl amine oxides and linear $C_8$-$C_{12}$ alkoxy ethyl di(hydroxyethyl) amine oxides. Particularly suitable amine oxides include linear $C_{10}$, linear $C_{10}$-$C_{12}$, and linear $C_{12}$-$C_{14}$ alkyl dimethyl amine oxides. Other examples of amine oxide nonionic surfactants include alkyl amidopropyl amine oxides, such as lauryl/myristyl amidopropyl amine oxides (e.g., lauryl/myristyl amidopropyl dimethylamine oxide).

Additional suitable nonionic surfactants include polyethoxylated fatty esters. These include, for example, polyethoxylated sorbitan monooleate, sorbitan monolaurate, sorbitan monopalmitate and/or sorbitan monostearate, and polyethoxylated castor oil. Specific examples of such surfactants are the products of condensation of ethylene oxide (e.g., 10-25 moles) with sorbitan monooleate and condensation of ethylene oxide (e.g., 20-40 moles) with castor oil.

Particularly suitable nonionic surfactants for use in the present cleaning compositions include ethoxylated fatty alcohols, e.g., ethoxylated $C_{12}$/$C_{14}$ fatty alcohols having a degree of ethoxylation of about 2 to 12 (2-12 EO) and more suitably a degree of ethoxylation of about 2 to 7;

ethoxylated oxo alcohols, e.g., ethoxylated $C_{11}$-$C_{13}$ oxo alcohols having a degree of ethoxylation of about 2 to 15 and more suitably a degree of ethoxylation of about 2 to 10;

ethoxylated Guebert alcohols, e.g., ethoxylated $C_{10}$ Guebert alcohols having a degree of ethoxylation of about 5 to 15 and more suitably a degree of ethoxylation of about 10 to 14; and ethoxylated secondary alcohols, e.g., ethoxylated $C_{11}$-$C_{15}$ secondary alcohols having a degree of ethoxylation of about 5 to 15 and more suitably a degree of ethoxylation of about 7 to 12;

alkyl polyglycosides, e.g., $C_{8-14}$ alkyl polyglucosides having an average degree of polymerization of about 1.2 to 2; and fatty alkyl dimethylamine oxides, e.g., $C_{8-14}$ n-alkyl dimethylamine oxides such as lauryl dimethylamine oxide.

The present cleaning compositions may include additional components or agents, such as additional functional materials (which may also be referred to as "adjuvants"). In some embodiments, the functional materials may be included to provide desired properties and functionalities to the cleaning composition. For the purpose of this application, the term "functional materials" include a material that when dispersed or dissolved in a concentrate and/or use solution, such as an aqueous solution, provides a beneficial property in a particular use. The present cleaning preparations containing the ionic liquids may optionally contain other soil-digesting components, surfactants, disinfectants, detergent fillers, sanitizers, acidulants, complexing agents, biocides, corrosion inhibitors, anti-redeposition agents, foam inhibitors, dyes, bleaching agents, enzymes, enzyme stabilizing systems, thickening or gelling agents, wetting agents, dispersants, stabilizing agents, and/or fragrances.

For example, the aqueous cleaning compositions may also include various adjuvants as is conventional for hard surface cleaners. Examples of such adjuvants include one or more of a fragrance, preservative, dyes, corrosion inhibitors, antioxidants and the like. Adjuvants are generally present in an amount less than 0.5 wt. % and commonly are present in an amount of about 100 ppm to about 0.2 wt. % of the composition.

As used herein, "hard surface" refers to any porous and/or non-porous surface.

In one embodiment, a hard surface may be selected from the group consisting of: ceramic, glass, metal, polymer, stone, and combinations thereof. A hard surface may be any shape, size, or have any orientation that is suitable for its desired purpose. In one nonlimiting example, a hard surface may be a window which may be oriented in a vertical configuration. In another non-limiting example, a hard surface may be the surface of a curved surface, such as a ceramic toilet bowl. It is thought that the shape, size and/or orientation of the hard surface will not substantially affect the cleaning compositions. Nonlimiting examples of ceramic surfaces include: toilet bowl, sink, shower, tile, the like, and combinations thereof. A non-limiting example of a glass surfaces includes: window, mirror and the like. Nonlimiting examples of metal surfaces include: drain pipe, sink, automobiles, and the like. Nonlimiting examples of a polymeric surface includes: fiberglass, acrylic, Corian®, and the like. A non-limiting example of a stone hard surface includes: granite, marble, and the like.

As used herein, "fragrance" refers to any perfume, odor-eliminator, odor masking agent, the like, and combinations thereof. In some embodiments, a fragrance is any substance which may have an effect on a consumer or user's olfactory senses.

As used herein, "surfactant" refers to any agent that lowers the surface tension of a liquid, for example water. Exemplary surfactants which may be suitable for use with the present invention are described infra. In general, surfactants may be selected from the group consisting of anionic surfactants, nonionic surfactants, cationic surfactants, amphoteric surfactants, zwitterionic surfactants, and combinations thereof. It may be particularly advantageous to include nonionic surfactants in the present cleaning compositions.

EXAMPLES

The following examples more specifically illustrate protocols for preparing aqueous cleaning compositions according to various embodiments described above. These examples should in no way be construed as limiting the scope of the present technology.

Example 1

Testing for effectiveness of grease removal was done using standard protocols for greasy kitchen soil removal. Three non-limiting examples of the presented aqueous cleaning composition were tested in a protocol to determine their effectiveness in removal of greasy kitchen soil (Kitchen Grease Test). The composition of the three formulas (Formulas 1A-1C) are presented in Table 1. As shown in FIG. 1, testing the three compositions in the Kitchen Grease Test resulted in an average of about 77% to 93% dirt and grease removal. In comparison, when twenty cleaners that are currently available on the market were tested, only three had a Kitchen Grease Test above 60% and none had a removal rate above 80%. The large majority of commercially available hard surface cleaners fail to remove even 50% of the greasy kitchen soil in this test. Moreover, the only commercial cleaner that had a Kitchen Grease Test result of about 80% removal is a product that is designed as an outdoor cleaner.

TABLE 1

| Raw material* | Formula-1A | Formula-1B | Formula-1C |
|---|---|---|---|
| Water | ~97 | ~97 | ~97 |
| Variquat CC9NS | 0.25 | 0.25 | 0.25 |
| BTC 2125 80% | 0.2 | 0.2 | 0.2 |

TABLE 1-continued

| Raw material* | Formula-1A | Formula-1B | Formula-1C |
|---|---|---|---|
| DIPA 85% | 2 | 2 | 2 |
| Fragrance | 0.1 | 0.1 | 0.1 |
| Lutensol XL80 | 0.2 | 0 | 0 |
| Lutensol XL 100 | 0 | 0.2 | 0 |
| Lutensol TDA 10 | 0 | 0 | 0.2 |

*Variquat CC9NS is a polypropoxylated 2-(diethylmethylammonio)ethanol chloride salt; Lutensol XL80 and Lutensol XL 100 are polyethylene glycol ether of a $C_{10}$-Guerbet alcohol; Lutensol TDA 10 is a tridecyl alcohol based ethoxylate; BTC 2125 is a mixture of n-alkyl dimethyl benzyl ammonium chloride and n-alkyl dimethyl ethylbenzyl ammonium chloride; and DIPA is diisopropanolamine.

Example 2

Table 2 below shows three additional formulas of illustrative examples of the present cleaning compositions.

TABLE 2

| Raw material* | Formula 2A | Formula 2B | Formula 2C |
|---|---|---|---|
| Water | ~96-97% | ~96-97% | ~96-97% |
| Variquat CC9NS | 0.1-3% | — | 0.1-3% |
| BMIM Octyl Sulfate | — | 0.1-3% | — |
| BTC 2125 80% | 0.1-0.4% | 0.1-0.4% | 0.1-0.4% |
| DIPA and/or MEA | 0.1-4% | 0.1-4% | 0.1-4% |
| Fragrance | 0.1 | 0.1 | 0.1 |
| Ethoxylated $C_{10}$-Guerbet Alcohol | 0.1-2% | 0.1-2% | — |
| Ethoxylated $C_{10}$-$C_{15}$ Linear Alcohol | — | — | 0.1-2% |

*BMIM Octyl Sulfate is the ionic liquid 1-butyl-3-methylimidazolium octyl sulfate ("octosulfate").

Example 3

Table 3 below shows additional formulas of illustrative examples of the present cleaning compositions.

TABLE 3

| Raw material* | Formula 3A | Formula 3B | Formula 3C | Formula 3D |
|---|---|---|---|---|
| Water | ~96-97% | ~96-97% | ~96-97% | ~96-97% |
| TMBA C10** | 0.1-3% | — | — | — |
| Choline Octosulfate | — | 0.1-3% | — | — |
| Crodaquat TES-NV-LQ-MH* | — | — | 0.1-3% | — |
| Stepantex SP-90*** | — | — | — | 0.1-3% |
| BTC 2125 80% | 0.1-0.4% | 0.1-0.4% | 0.1-0.4% | 0.1-0.4% |
| DIPA and/or MEA | 0.1-4% | 0.1-4% | 0.1-4% | 0.1-4% |
| Fragrance | 0.1 | 0.1 | 0.1 | 0.1 |
| Ethoxylated (5-10 EO) $C_{10}$-$C_{15}$ Alcohol | 0.1-2% | 0.1-2% | 0.1-2% | 0.1-2% |
| $Na_4$ Iminodisuccinate | 0-0.2% | 0-0.2% | 0-0.2% | 0-0.2% |

*Crodaquat TES-NV-LQ-MH - N-Ethyl-N,N-dipolyethoxyethyl-N-tallowalkylammonium ethosulfate
**TMBA C10 is N,N,N trimethylbutyl ammonium decanoate
***Stepanquat SP-90 is Di(palmiticcarboxyethyl) hydroxyethyl methyl ammonium methosulfate

Example 4

Table 4 below shows additional formulas of illustrative examples of the present cleaning compositions.

TABLE 4

| Raw material* | Formula 4A | Formula 4B | Formula 4C | Formula 4D |
|---|---|---|---|---|
| Water | ~96-97% | ~96-97% | ~96-97% | ~96-97% |
| Variquat CC9NS | 0.1-0.5% | — | 0.1-0.5% | — |
| BMIM Octyl Sulfate | | 0.1-0.5% | — | 0.1-0.5% |
| BTC 2125 80% | 0.2-0.4% | 0.2-0.4% | — | — |
| DIPA and/or MEA | 1-3% | 1-3% | 1-3% | 1-3% |
| Fragrance | 0.1 | 0.1 | 0.1 | 0.1 |
| Ethoxylated (5-15 EO) $C_{10}$-$C_{15}$ Alcohol | 0.1-0.5% | 0.1-0.5% | 0.1-0.5% | 0.1-0.5% |
| $Na_4$ Iminodisuccinate | 0.01-0.2% | 0.01-0.2% | 0.01-0.2% | 0.01-0.2% |

Example 5

Table 5 below shows additional formulas of illustrative examples of the present cleaning compositions.

TABLE 5

| Raw material* | Formula 5A | Formula 5B | Formula 5C |
|---|---|---|---|
| Water | ~96-97% | ~96-97% | ~96-97% |
| Variquat K1215* | 0.1-3% | — | — |
| Stepanquat ML** | — | 0.1-3% | — |
| Mackernium SFES*** | — | — | 0.1-3% |
| BTC 2125 80% | 0.1-0.4% | 0.1-0.4% | 0.1-0.4% |
| DIPA and/or MEA | 0.1-4% | 0.1-4% | 0.1-4% |
| Fragrance | 0.1 | 0.1 | 0.1 |
| Ethoxylated (5-10 EO) $C_{10}$-$C_{15}$ Alcohol | 0.1-2% | 0.1-2% | 0.1-2% |
| $Na_4$ Iminodisuccinate | 0-0.2% | 0-0.2% | 0-0.2% |

*methyl bis(polyethoxyethanol) coco ammonium chloride

**quaternary ammonium salt prepared by reacting oleic acid with N,N,N',N'-tetrakis (2-hydroxypropyl) ethylene-diamine methosulfate

***sunflowerseedamidopropyl ethydimonium quaternary ethosulfate salt

Illustrative Embodiments

In one aspect, the aqueous cleaning composition may include (a) an ionic liquid; (b) amino alcohol, such as diisopropanolamine, triethanolamine, diethanolamine and/or monoethanolamine and (c) water. Such a cleaning composition may optionally also include disinfecting quaternary surfactant and/or nonionic surfactant. In some instances, the cleaning composition may also include a chelating agent. Suitable chelating agents include aminopolycarboxylate chelating agents, such as an iminodisuccinate salt and/or an ethylenediaminetetraacetate salt. Other suitable aminopolycarboxylate chelating agents include hydroxyethylethylenediaminetriacetate (HEEDTA), 2-hydroxyethyliminodiacetate (HEIDA) and nitrilotriacetate (NTA).

In some embodiments, the ionic liquid may include one or more of the following ionic liquids:

N-alkyl-N,N-dipolyethoxyethyl-N-alkylammonium alkylsulfate, e.g., N-methyl-N,N-dipolyethoxyethyl-N—($C_{14}$-$C_{18}$)alkylammonium methosulfate and/or N-ethyl-N,N-dipolyethoxyethyl-N—($C_{14}$-$C_{18}$)alkylammonium ethosulfate, such as N-ethyl-N,N-dipolyethoxyethyl-N-tallowalkylammonium ethosulfate;

choline alkyl sulfate, e.g., choline octylsulfate;

N,N,N-trimethyl-alkyl ammonium fatty acid salt, e.g., N,N,N-trimethyl alkylammonium $C_8$-$C_{14}$-fatty alkanoate such as N,N,N-trimethyl-butyl ammonium decanoate ("butyl trimonium decanoate");

alkylamidoalkyl alkyldimonium alkylsulfate, such as a ($C_{14}$-$C_{22}$)-fatty alkylamidopropyl alkyldimonium alkyl sulfate, e.g., sunflowerseed amidopropyl ethyldimonium ethosulfate and/or ($C_{14}$-$C_{18}$)-fatty alkylamidopropyl trimonium methosulfate; and quaternary ammonium salt prepared by reacting fatty acid (e.g., $C_{16}$-$C_{18}$ fatty acid) with N-alkyl-N,N,N',N'-tetrakis(2-hydroxypropyl)-ethylene-diamine alkyl sulfate and/or tris-(hydroxyethyl)-alkyl ammonium alkyl sulfate, e.g., quaternary ammonium salt prepared by reacting oleic acid with N-methyl-N,N,N',N'-tetrakis(2-hydroxypropyl) ethylene-diamine methosulfate or a quaternary ammonium salt prepared by reacting palmitic acid with tris-(hydroxyethyl)-methyl ammonium methosulfate.

In one aspect, the aqueous cleaning composition may include (a) a polypropoxy quaternary ammonium halide ionic liquid; (b) amino alcohol, such as diisopropanolamine, triethanolamine, diethanolamine and/or monoethanolamine and (c) water. Such a cleaning composition may optionally also include disinfecting quaternary surfactant and/or nonionic surfactant. In some instances, the cleaning composition may also include a chelating agent, e.g., an aminopolycarboxylate chelating agent, such as an iminodisuccinate salt and/or an ethylenediaminetetraacetate salt. The polypropoxy quaternary ammonium halide may include a polypropoxylated 2-(diethylmethylammonio)ethanol salt, e.g., (diethylmethylammonio)ethanol salt containing about 5 to 15 propoxy subunits. The disinfecting quaternary surfactant may include N—$C_{10}$-$C_{18}$-alkyl-N,N-dimethyl benzyl ammonium chloride and/or N—$C_{10}$-$C_{18}$-alkyl-N,N-dimethyl ethylbenzyl ammonium chloride. The nonionic surfactant may include ethoxylated fatty alcohol, ethoxylated oxo alcohol, ethoxylated Guerbet alcohol, ethoxylated secondary alcohol, alkylpolygycoside, and/or polyethoxylated fatty ester. For example, nonionic surfactant may include an ethoxylated $C_8$-$C_{12}$-Guerbet alcohol, e.g., having about 5 to 15 ethoxy groups. In some instances, the ionic liquid may include polypropoxylated 2-(diethylmethyl-ammonio)ethanol chloride salt; the amino alcohol may include diisopropanolamine and/or monoethanolamine; the disinfecting quaternary surfactant may include N-n-$C_{12}$-$C_{14}$-alkyl-N,N-dimethyl benzyl ammonium chloride and/or N-n-$C_{12}$-$C_{14}$-alkyl-N,N-dimethyl ethylbenzyl ammonium chloride; and the nonionic surfactant may include a polyethylene glycol ether of a $C_{10}$-Guerbet alcohol.

In one aspect, the aqueous cleaning composition may consist essentially of (a) a polypropoxy quaternary ammonium chloride ionic liquid; (b) amino alcohol selected from diisopropanolamine, triethanolamine, diethanolamine and/or monoethanolamine; (c) disinfecting quaternary surfactant; (d) nonionic surfactant; and (e) water. In some embodiments, the ionic liquid may include a polypropoxylated 2-(diethylmethylammonio)ethanol salt; the amino alcohol may include diisopropanolamine and/or monoethanolamine; the disinfecting quaternary surfactant may include N—$C_{10-18}$-alkyl-N,N-dimethyl benzyl ammonium chloride and/or N—$C_{10-18}$-alkyl-N,N-dimethyl ethylbenzyl ammonium chloride; and the nonionic surfactant may include a polyethylene glycol ether of a $C_{8-12}$-Guerbet alcohol. In another embodiment, the ionic liquid may be a polypropoxylated 2-(diethylmethylammonio)ethanol salt; the amino alcohol may be diisopropanolamine and/or monoethanolamine; the disinfecting quaternary surfactant may be N-n-$C_{12-14}$-alkyl-N,N-dimethyl benzyl ammonium chloride and/or N-n-$C_{12-14}$-alkyl-N,N-dimethyl ethylbenzyl ammonium chloride; and the nonionic surfactant may be a polyethylene glycol ether of a $C_{10}$-Guerbet alcohol. In some embodiments, the nonionic surfactant may include an ethoxylated alcohol, alkylpolygycoside, alkyl amine oxide, ethoxylated alcohol, and/or polyethoxylated fatty ester.

In another aspect, the aqueous cleaning composition may consist essentially of (a) about 0.05-3 (preferably 0.1-1) wt. % polypropoxy quaternary ammonium halide ionic liquid; (b) about 0.1-5 (preferably 0.5-4) wt. % amino alcohol; (c) about 0.05-1 wt. % disinfecting quaternary surfactant; (d) 0 to about 2 wt. % nonionic surfactant; (e) 0 to about 0.5 wt. % aminopolycarboxylate chelating agent; (f) 0 to about 2 wt. % of one or more adjuvants; and (g) a balance water. The polypropoxy quaternary ammonium halide ionic liquid may include a polypropoxylated 2-(diethylmethylammonio)ethanol chloride; the amino alcohol may include diisopropanolamine and/or monoethanolamine; the disinfecting quaternary surfactant may include quaternary benzyl ammonium surfactant; and the nonionic surfactant may include ethoxylated alcohol. In some embodiments, the one or more adjuvants may include fragrance. In some embodiments, the aqueous cleaning composition may consist essentially of: (a) about 0.05-1 wt. % polypropoxylated 2-(diethylmethylammonio)ethanol chloride; (b) about 1-4 wt. % diisopropanolamine and/or monoethanolamine; (c) 0 to about 0.3 wt. % N-n-$C_{12-14}$-alkyl-N,N-dimethyl benzyl ammonium chloride and/or N-n-$C_{12-14}$-alkyl-N,N-dimethyl ethylbenzyl ammonium chloride; (d) 0 to about 0.5 (preferably about 0.1-0.3) wt. % polyethylene glycol ether of a $C_{8-12}$-Guerbet alcohol; (e) 0 to about 2 wt. % of one or more adjuvants; and (f) a balance water.

In one aspect, the aqueous cleaning composition may include (a) an ionic liquid, which comprises 1,3-dialkyl substituted imidazolium alkyl sulfate; (b) an amino alcohol; (c) optionally, a disinfecting quaternary surfactant; (d) optionally, a nonionic surfactant; and (e) water. In some embodiments, the 1,3-dihydrocarbyl substituted imidazolium salt may be a 1,3-dialkyl substituted imidazolium alkyl sulfate salt. In another embodiment, the 1,3-dihydrocarbyl substituted imidazolium salt may be a 1-methyl-3-n-$C_{3-6}$-alkyl substituted imidazolium $C_{6-10}$-alkyl sulfate salt and/or a 1-ethyl-3-n-$C_{3-6}$-alkyl substituted imidazolium $C_{6-10}$-alkyl sulfate salt. In some embodiments, the composition may include about 0.05-3 wt. % of the ionic liquid; about 0.05-5 wt. % of amino alcohol; and at least about 90 wt. % water. The composition may include (a) about 0.1-1 wt. % of the ionic liquid; (b) about 1-4 wt. % of the amino alcohol; (c) 0 to about 0.5 wt. % of the disinfecting quaternary surfactant; (d) 0 to about 3 wt. % of the nonionic surfactant; (e) 0 to about 0.5 wt. % aminopolycarboxylate chelating agent; (f) about 0-2 wt. % of one or more adjuvants; and (g) a balance water. In some embodiments, the ionic liquid may include a 1-methyl-3-(alkyl/alkenyl)imidazolium salt and/or a 1-ethyl-3-(alkyl/alkenyl)imidazolium salt. In another embodiment, the ionic liquid may include 1-methyl-3-butylimidazolium octyl sulfate. In some embodiments, the ionic liquid may include 1-methyl-3-butylimidazolium octyl sulfate; the amino alcohol may be selected from diisopropanolamine, isopropanolamine, triethanolamine, diethanolamine and/or monoethanolamine; the disinfecting quaternary surfactant may include quaternary benzyl ammonium surfactant; and the nonionic surfactant may include ethoxylated alcohol. In another embodiment, the composition may consist essentially of (a) 0.05-1 wt. % 1-methyl-3-butylimidazolium octyl sulfate; (b) about 1-4 wt. % diisopropanolamine and/or monoethanolamine; (c) about 0.1-0.3 wt. % N-n-$C_{12}$-$C_{14}$-alkyl-N,N-dimethyl benzyl ammonium chloride and/or N-n-$C_{12}$-$C_{14}$-alkyl-N,N-dimethyl ethylbenzyl ammonium chloride; (d) about 0.1-0.5 (preferably about 0.1-0.3) wt. % polyethylene glycol ether of a $C_8$-$C_{12}$-Guerbet alcohol; (e) 0 to about 2 wt. % of one or more adjuvants; and (f) a balance water.

In one aspect, the present aqueous cleaning composition may include (a) an ionic liquid, which comprises polypropoxy quaternary ammonium salt; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % polypropoxy quaternary ammonium halide; (b) about 0.1-5 wt. % diisopropanolamine, isopropanolamine, triethanolamine, diethanolamine and/or monoethanolamine; (c) about 0.05-2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The composition may also include an aminopolycarboxylate chelating agent, such as an iminodisuccinate salt and/or an ethylenediaminetetraacetate salt. The ionic liquid may include a polypropoxylated 2-(diethylmethylammonio)ethanol halide salt, such as polypropoxylated 2-(diethylmethylammonio)-ethanol chloride salt having about 5 to 15 propoxy units.

In one aspect, the present aqueous cleaning composition may include (a) an ionic liquid, which comprises 1,3-dialkyl substituted imidazolium salt; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % of the 1,3-dialkyl substituted imidazolium salt; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include a 1-methyl-3-n-$C_{3-6}$-alkyl substituted imidazolium $C_{6-10}$-alkyl sulfate salt and/or a 1-ethyl-3-n-$C_{3-6}$-alkyl substituted imidazolium $C_{6-10}$-alkyl sulfate salt.

In some embodiments, the ionic liquid may include a di(fatty acyloxyalkyl) hydroxyalkyl ammonium quaternary salt, e.g., an N,N-di(fatty acyloxyalkyl)-N-hydroxyalkyl N-alkylammonium quaternary salt, such as a N,N-di(($C_{16-18}$)fatty acyloxyethyl)-N-hydroxyethyl methylammonium methosulfate, and/or an N,N-di(2-($C_{16-18}$)fatty acyloxypropyl)-N'-methyl-N',N'-di(2-hydroxypropyl)ethylenediamine methosulfate. Suitable examples may be produced by reacting a fatty acid(s) with an N-alkyl-N,N,N',N'-tetrakis(2-hydroxypropyl)-ethylene-diamine alkyl sulfate and/or an tris-(hydroxyethyl)-alkyl ammonium alkyl sulfate.

In some embodiments, the ionic liquid may include an N-alkyl-N,N-dipolyethoxyethyl-N-fatty alkyl ammonium salt, such as an N—($C_{1-2}$)alkyl-N,N-bis(polyethoxyethyl)-N—($C_{8-22}$)alkyl ammonium salt, wherein the salt includes a chloride, methosulfate and/or ethosulfate anion. For example, the ionic liquid may include an N-ethyl-N,N-dipolyethoxyethyl-N—($C_{14-18}$)alkyl ammonium ethosulfate and/or N-methyl-N,N-dipolyethoxyethyl-N—($C_{14-18}$)alkyl ammonium methosulfate and/or. Other suitable examples may include an N-methyl-N,N-bis(polyethoxyethyl)-N—($C_{8-14}$)alkyl ammonium chloride and/or N-ethyl-N,N-bis (polyethoxyethyl)-N—($C_{8-14}$)alkyl ammonium chloride. Other suitable examples may include an N-ethyl-N,N-bis (polyethoxyethyl)-N—($C_{16-18}$)alkyl ammonium ethosulfate and/or N-methyl-N,N-bis(polyethoxyethyl)-N—($C_{16-18}$)alkyl ammonium methosulfate.

In some embodiments, the ionic liquid may include a 1,3-dialkyl substituted imidazolium salt, such as a 1—($C_{1-2}$)-alkyl-3—($C_{3-8}$)-n-alkyl substituted imidazolium ($C_{6-10}$)-alkyl sulfate salt, e.g., 1-methyl-3-n-butylimidazolium octosulfate, 1-methyl-3-n-pentylimidazolium octosulfate and/or 1-methyl-3-n-hexylimidazolium octosulfate.

In some embodiments, the ionic liquid may include a fatty alkylamidoalkyl alkyldimonium alkylsulfate, such as a fatty ($C_{16-18}$)alkylamidopropyl ethyldimonium ethosulfate salt and/or fatty ($C_{16-18}$)alkylamidopropyl trimonium methosulfate salt.

In one aspect, the present aqueous cleaning composition may include (a) an ionic liquid, which comprises N-alkyl-N,N-dipolyethoxyethyl-N-alkylammonium alkyl sulfate; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % of the N-alkyl-N,N-dipolyethoxyethyl-N-alkyl ammonium alkyl sulfate; (b) about 0.1-5 wt. % diisopropanolamine, isopropanolamine, triethanolamine, diethanolamine and/or monoethanolamine; (c) about 0.05-2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include an N-methyl-N,N-dipolyethoxyethyl-N—($C_{14-18}$)alkylammonium methosulfate and/or N-ethyl-N,N-dipolyethoxyethyl-N—($C_{14-18}$)alkylammonium ethosulfate.

In one aspect, the present aqueous cleaning composition may include (a) an ionic liquid, which comprises alkylamidopropyl alkyldimonium alkylsulfate; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % of the alkylamidopropyl alkyldimonium alkyl sulfate; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include a $C_{14-18}$-fatty alkylamidopropyl ethyldimonium ethosulfate and/or $C_{14-18}$-fatty alkylamidopropyl trimonium methosulfate.

In one aspect, the present aqueous cleaning composition may include (a) an ionic liquid, which comprises choline alkylsulfate; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % choline $C_6$-$C_{10}$-alkylsulfate; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent; (f) 0 to about 2 wt. % of one or more adjuvants; and a balance of water. The one or more adjuvants may commonly include fragrance. The ionic liquid may include choline octylsulfate.

In one aspect, the present aqueous cleaning composition may include (a) an ionic liquid, which comprises N,N,N-trimethyl-alkyl ammonium fatty acid salt ("N-alkyl trimonium fatty acid salt"); (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. In some embodiments, the ionic liquid may include an N-alkyl trimonium fatty alkanoate, such as a butyl trimonium ($C_{8-12}$)-fatty alkanoate. For example, such aqueous cleaning composition may include (a) about 0.05-3 wt. % of the N,N,N-trimethyl-alkyl ammonium fatty acid salt; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include an N,N,N-trimethyl-alkyl ammonium $C_{8-14}$-fatty alkanoate ("alkyl trimonium $C_{8-14}$-fatty alkanoate"), such as N,N,N-trimethyl-butyl ammonium decanoate.

In one aspect, the present aqueous cleaning composition may include (a) an ionic liquid, which includes a quaternary ammonium salt prepared by reacting fatty acid (e.g., a $C_{16-18}$-fatty acid such as palmitic and/or oleic acid) with N-alkyl-N,N,N',N'-tetrakis(2-hydroxypropyl)-ethylene-diamine alkyl sulfate and/or tris-(hydroxyethyl)-alkyl ammonium alkyl sulfate; (b) amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % of the quaternary ammonium salt; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include a quaternary ammonium salt formed by reacting $C_{16}$-$C_{18}$ fatty acid with N-alkyl-N,N,N',N'-tetrakis(2-hydroxypropyl)-ethylene-diamine alkyl sulfate or tris-(hydroxyethyl)-alkyl ammonium alkyl sulfate.

In one aspect, the present aqueous cleaning composition may include (a) an ionic liquid, which comprises polypropoxylated 2-(diethylmethylammonio)ethanol salt; (b)

amino alcohol; (c) optionally, disinfecting quaternary surfactant; (d) optionally, nonionic surfactant; (e) optionally, chelating agent; and (f) water. Such compositions are typically, other than the amino alcohol component, substantially free (<0.1 wt. %) of volatile organic compounds. For example, such aqueous cleaning composition may include (a) about 0.05-3 wt. % polypropoxylated 2-(diethylmethylammonio)ethanol salt; (b) about 0.1-5 wt. % diisopropanolamine, isopropanolamine, triethanolamine, diethanolamine and/or monoethanolamine; (c) 0 to about 2 wt. % nonionic surfactant; (d) 0 to about 1 wt. % quaternary benzyl ammonium surfactant; (e) 0 to about 0.5 wt. % aminopolycarboxylate chelating agent, such as an iminodisuccinate salt; (f) 0 to about 2 wt. % of one or more adjuvants; and a balance of water. The one or more adjuvants may commonly include fragrance. The ionic liquid may include polypropoxylated 2-(diethylmethylammonio)ethanol chloride.

In some embodiments, the present aqueous cleaning composition may include the ionic liquid, amino alcohol, such as diisopropanolamine, triethanolamine, diethanolamine and/or monoethanolamine and, optionally, one or more of disinfecting benzyl quaternary surfactant, nonionic surfactant (e.g., ethoxylated alcohol) and aminopolycarboxylate chelating agent. In such compositions the ionic liquid may include one or more of:

1) polypropoxylated 2-(diethylmethylammonio)ethanol;
2) choline alkylsulfate;
3) alkyl trimonium fatty alkanoate;
4) N-(methyl/ethyl)-N,N-dipolyethoxyethyl-N-alkylammonium (methyl/ethyl)sulfate;
5) alkylamidopropyl alkyldimonium alkyl sulfate;
6) 1,3-dialkyl substituted imidazolium salt; and
7) quaternary ammonium salt prepared by reacting fatty acid with N-alkyl-N,N,N',N'-tetrakis(2-hydroxypropyl)-ethylene-diamine alkyl sulfate or tris-(hydroxyethyl)-alkyl ammonium alkyl sulfate.

Such compositions may desirably include an aminopolycarboxylate chelating agent, such as an iminodisuccinate salt and/or an ethylenediaminetetraacetate salt.

Some embodiments provide an aqueous cleaning concentrate, which may include (a) about 3-15 wt. % ionic liquid, which may include a polypropoxylated quaternary ammonium salt, such as a polypropoxylated 2-(trialkylammonio) ethanol salt; (b) about 3-15 wt. % amino alcohol; and (c) at least about 50 wt. % water. The cleaning concentrate may also include about 3-15 wt. % quaternary benzyl ammonium surfactant; and/or about 3-15 wt. % nonionic surfactant. The nonionic surfactant typically includes ethoxylated alcohol, such as In some aspects, the cleaning concentrate may also include an aminopolycarboxylate chelating agent, such as an iminodisuccinate salt, e.g., an alkali metal iminodisuccinate salt such as $Na_4$ iminodisuccinate. In some aspects of such a concentrate, the concentrate may include about 3-15 wt. % and, commonly, about 5-10 wt. % polypropoxylated 2-(diethylmethylammonio)ethanol chloride as an ionic liquid component. Such cleaning concentrates may be diluted with water before use to provide compositions of the type described herein as a "ready-to-use" aqueous cleaning composition.

While certain embodiments have been illustrated and described, it should be understood that changes and modifications can be made therein in accordance with ordinary skill in the art without departing from the technology in its broader aspects.

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. An aqueous cleaning composition comprising: (a) an ionic liquid, which comprises alkylamidoalkyl alkyldimonium alkylsulfate; (b) amino alcohol; (c) at least about 50 wt. % water; and (d) a disinfecting quaternary surfactant, the disinfecting quaternary surfactant comprising N-n-$C_{12-14}$-alkyl-N,N-dimethyl benzyl ammonium chloride and/or N-n-$C_{12-14}$-alkyl-N,N-dimethyl ethylbenzyl ammonium chloride.

2. The composition of claim 1, wherein other than the amino alcohol and an optional fragrance component, the composition has a volatile organic content (VOC) of less than wt. %.

3. The composition of claim 1, further comprising a nonionic surfactant and/or a chelating agent.

4. The composition of claim 1, wherein the composition comprises:

(a) about 0.05 to 3 wt. % of ionic liquid;

(b) about 0.5 to 5 wt. % of the amino alcohol; and (c) at least about 90 wt. % water.

5. The composition of claim 1, wherein the composition comprises about 0.05-3 wt. % of the ionic liquid; and about 0.05-5 wt. % of the amino alcohol.

6. The composition of claim 1, wherein the amino alcohol comprises diisopropanolamine, isopropanolamine, triethanolamine, diethanolamine, and/or monoethanolamine.

7. The composition of claim 1, further comprising an aminopolycarboxylate chelating agent, which comprises an iminodisuccinate salt, an ethylenediaminetetraacetate (EDTA) salt, a hydroxyethylethylenediaminetriacetate (HEEDTA) salt, 2-hydroxyethyliminodiacetate (HEIDA) salt and/or a nitrilotriacetate (NTA) salt.

8. The composition of claim 1, further comprising a nonionic surfactant, which comprises an ethoxylated $C_{10-15}$-aliphatic alcohol having an average of about 5 to 15 ethylene oxide subunits.

9. The composition of claim 1, wherein the composition comprises: (a) about 0.05-3 wt. % of the ionic liquid; (b) about 0.5-5 wt. % of the amino alcohol; (c) at least about 90 wt. % water; (d) up to about 1 wt. % of the disinfecting quaternary surfactant; (e) up to about 5 wt. % nonionic surfactant; and (f) up to about 0.5 wt. % aminopolycarboxylate chelating agent.

10. The composition of claim 1, further comprising choline alkylsulfate.

11. The composition of claim 1, further comprising 1,3-dihydrocarbyl substituted imidazolium salt.

12. The composition of claim 1, further comprising polyalkoxylated alkylammonium quaternary salt.

13. The composition of claim 1, further comprising alkyl trimonium fatty alkanoate.

14. The composition of claim 1, further comprising di(fatty acyloxyalkyl)hydroxyalkyl ammonium quaternary salt.

15. The composition of claim 1, further comprising a quaternary ammonium salt prepared by reacting a $C_{16-18}$ fatty acid with N-alkyl-N,N,N',N'-tetrakis(2-hydroxypropyl)-ethylene-diamine alkyl sulfate or tris-(hydroxyethyl)-alkyl ammonium alkyl sulfate.

16. The composition of claim 1, further comprising choline (C6-10)-alkyl sulfate.

17. The composition of claim 1, wherein the ionic liquid further comprises two or more of:

i) 1,3-dihydrocarbyl substituted imidazolium salt;

ii) choline (C6-10)-alkyl sulfate; and iii) a quaternary ammonium salt prepared by reacting a $C_{16-18}$ fatty acid with N-alkyl-N,N,N',N'-tetrakis(2-hydroxypropyl)-ethylene-diamine alkyl sulfate or tris-(hydroxyethyl)-alkyl ammonium alkyl sulfate.

* * * * *